United States Patent
Munari

(10) Patent No.: US 6,578,236 B2
(45) Date of Patent: Jun. 17, 2003

(54) TWO-PART COOKING VESSEL GRIP, PARTICULARLY SUITABLE FOR USE AS A LID GRIP

(75) Inventor: Marco Munari, Cardano Al Campo (IT)

(73) Assignee: La Termoplastic F.B.M. S.R.L., Via Del Tornago (IT)

( * ) Notice: Subject to any disclaimer, the term of this patent is extended or adjusted under 35 U.S.C. 154(b) by 0 days.

(21) Appl. No.: 09/919,375

(22) Filed: Jul. 31, 2001

(65) Prior Publication Data

US 2002/0032952 A1 Mar. 21, 2002

(30) Foreign Application Priority Data

Aug. 3, 2000 (EP) .............................................. 00830556

(51) Int. Cl.[7] .............................................. A45C 13/26
(52) U.S. Cl. ........................ 16/444; 16/425; 16/DIG. 24
(58) Field of Search ........................ 16/444, 406, 422, 16/425, DIG. 24, 435; 126/373.1; D07/393, 394; 294/31.1, 32, 145

(56) References Cited

U.S. PATENT DOCUMENTS

| | | | | |
|---|---|---|---|---|
| 3,956,792 A | * | 5/1976 | Fischbach | 220/759 |
| 4,148,250 A | * | 4/1979 | Miki et al. | 220/374 |
| 4,201,312 A | * | 5/1980 | Basile | 220/314 |
| 4,617,452 A | * | 10/1986 | Miwa | 219/440 |
| 5,056,188 A | * | 10/1991 | Kramer | 16/110.1 |
| 5,170,533 A | * | 12/1992 | Barry | 16/425 |
| 5,662,375 A | * | 9/1997 | Adams et al. | 16/110.1 |
| 6,273,285 B1 | * | 8/2001 | Chang | 116/137 R |
| D456,669 S | * | 5/2002 | Munari | D7/392.1 |

FOREIGN PATENT DOCUMENTS

| | | | |
|---|---|---|---|
| FR | 2786681 A1 | * | 12/1998 |
| JP | 1998-104202 | * | 12/1997 |

\* cited by examiner

Primary Examiner—Gary Estremsky
Assistant Examiner—Mark Williams
(74) Attorney, Agent, or Firm—Ladas & Parry

(57) ABSTRACT

A two-part cooking vessel grip, particularly suitable for use as a lid grip, having a base element and a grip element projecting from the base element; the base element and the grip element are defined by respective separate parts connected to each other by click-on fastening means; and, according to the invention, the grip element has an arc-shaped portion of predetermined radial flexibility, and the click-on fastening means are carried by respective opposite ends of the arc-shaped portion, so as to enable the grip element to click easily onto the base element.

10 Claims, 2 Drawing Sheets

TWO-PART COOKING VESSEL GRIP, PARTICULARLY SUITABLE FOR USE AS A LID GRIP

The present invention relates to a two-part cooking vessel grip, particularly suitable for use as a lid grip.

BACKGROUND OF THE INVENTION

As is known, difficulty is encountered in producing cooking vessel grips which, in addition to good mechanical and thermal characteristics (in particular, mechanical strength, wear resistance, thermal insulation, and high-temperature resistance), are also easy to produce and form into complex shapes. This is particularly true of lid grips, which must comprise a connecting portion fitted to the lid, and a grip portion projecting from the connecting portion. Such a conformation poses specific manufacturing problems and, generally speaking, does not permit straightforward, low-cost production of complex shapes, which is why known grips are normally defined by monolithic bodies of thermosetting polymer materials, e.g. with an extended phenol-formaldehyde resin base. Though good thermal insulators, such materials are mechanically poor and, in particular, are difficult to form into complex shapes and to color.

On the other hand, grips cannot be made entirely of thermoplastic polymer materials which, though easy to work and color, do not have the necessary thermal characteristics to be used in direct contact with very hot surfaces (such as lids).

Difficulty is also encountered in producing two-part grips. Though grips are known in which a monolithic body of thermosetting resin is combined with an insert of thermoplastic material, it is not easy to ensure efficient connection of parts made of different, and normally incompatible, materials: known connecting systems (mechanical using screws or rivets, co-molding, etc.) are complicated and relatively expensive, and anyway make it difficult to form highly complex shapes, particularly the lid grip design referred to above.

SUMMARY OF THE INVENTION

It is an object of the present invention to eliminate the aforementioned drawbacks, and in particular to provide a cooking vessel grip, particularly suitable for use as a lid grip, which can be made simply and relatively cheaply from two different materials to obtain aesthetic and functional designs otherwise unachievable using conventional materials.

According to the present invention, there is provided a two-part cooking vessel grip, particularly suitable for use as a lid grip, as claimed in claim 1.

The grip according to the invention, which is particularly suitable for use as a lid grip, can be made easily and relatively cheaply in a wide range of shapes, colors, color combinations and aesthetic designs in general, while at the same time being functional, strong and long-lasting, and providing for good thermal insulation.

BRIEF DESCRIPTION OF THE DRAWINGS

A number of non-limiting embodiments of the present invention will be described by way of example with reference to the accompanying drawings, in which.

DETAILED DESCRIPTION OF THE INVENTION

Figure 1:
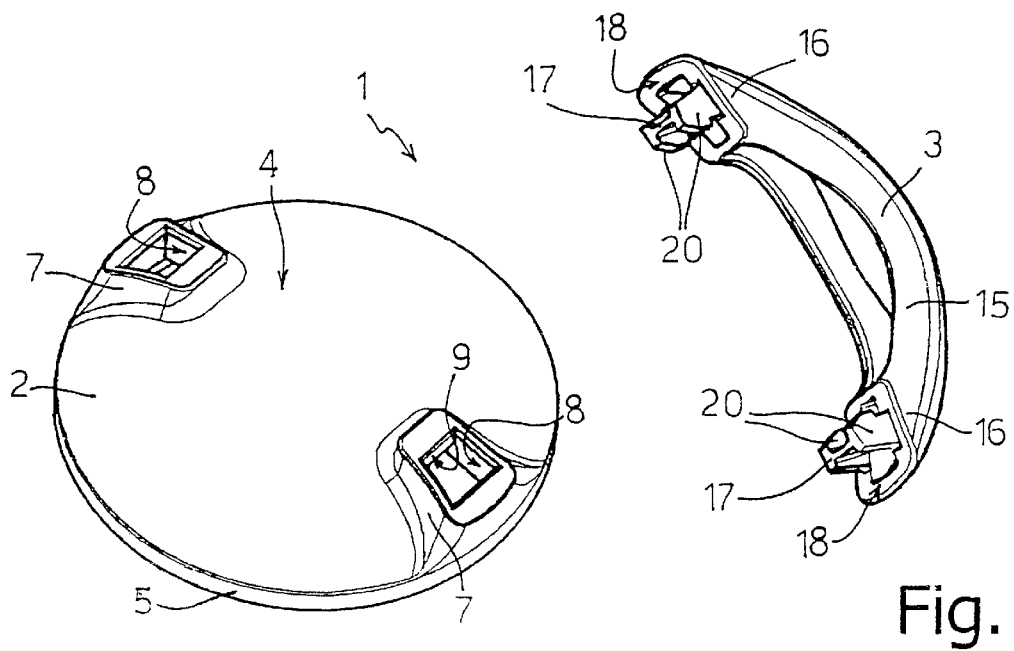
FIG. 1 shows an exploded view in perspective of a first embodiment of a grip in accordance with the invention.
Figure 2:
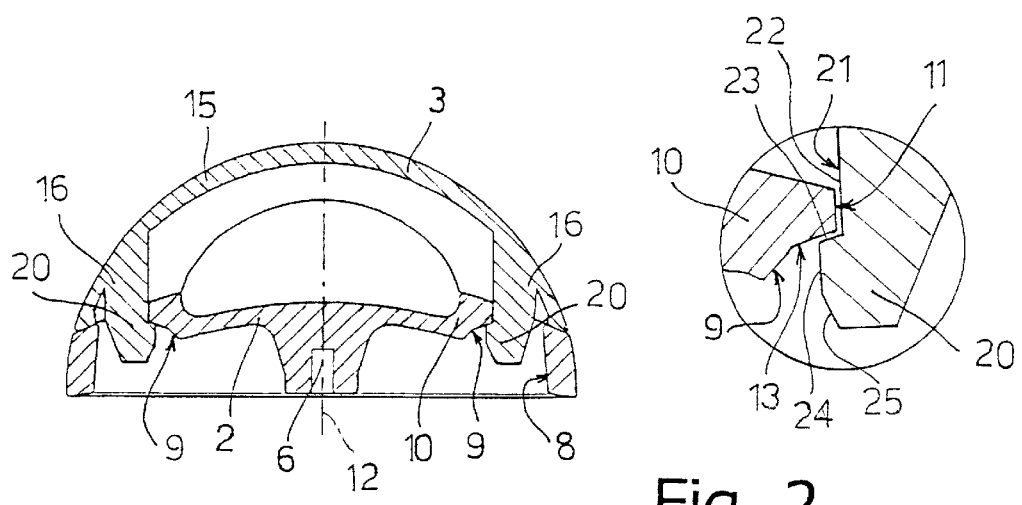
FIG. 2 shows a section and larger-scale detail of the FIG. 1 grip as assembled.
Figure 3:
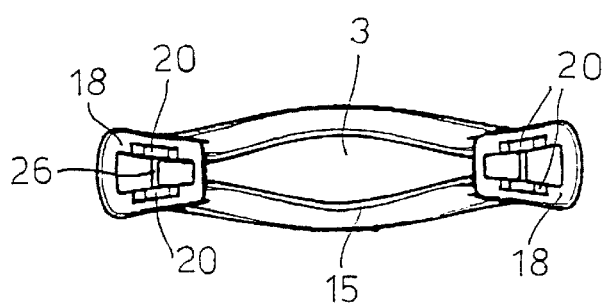
FIG. 3 shows an underside view of one part of the FIG. 1 grip.

With reference to FIGS. 1 to 3, number 1 indicates as a whole a cooking vessel grip—in the example shown, a grip for a lid (not shown). Grip 1 comprises a base element 2 and a grip element 3 projecting from base element 2; and base element 2 and grip element 3 are defined by respective separate parts which click together as described later on.

More specifically, base element 2 is defined by a monolithic, spherical-bowl-shaped body made of thermosetting polymer material, e.g. an extended phenol-formaldehyde resin, and comprises a convex upper surface 4, which in use is placed in view on the lid; a circular peripheral edge 5 for connection to a surface of the lid; fastening means 6 of any known type for connection to the lid and defined, for example, by a central dead hole for receiving a screw fitted to the lid; and two diametrically opposite projections 7 projecting perpendicularly from convex surface 4. Projections 7 have respective inner through cavities 8 having respective seats 9 formed in respective radially inner boundary walls 10 of cavities 8. More specifically, boundary walls 10 have respective portions 11 substantially parallel to each other and to a central axis 12 of base element 2; and respective portions 13 consecutive to portions 11 and sloping radially inwards.

Grip element 3 is defined by a monolithic body made of thermoplastic polymer material, and, according to the invention, comprises at least one arc-shaped portion 15 having, at opposite ends 16, respective click-on fastening means 17 for connection to base element 2. In the non-limiting example shown in FIGS. 1 to 3, the whole monolithic body defining grip element 3 is arc-shaped, and portion 15 is located longitudinally with respect to grip element 3 and substantially coincides with grip element 3 as a whole. Being arc-shaped, and by virtue of the material from which it is made, grip element 3 has a certain amount of radial flexibility to allow it predetermined amount of radial deformation.

Ends 16 of grip element 3 have respective continuous edges 18 shaped to mate with projections 7; and click-on fastening means 17 comprise a first and a second pair of connecting teeth 20 carried by grip element 3 at respective opposite ends 16, and which engage seats 9 formed in base element 2. More specifically, each pair of teeth 20 comprises two side by side connecting teeth projecting perpendicularly from a respective edge 18 of grip element 3 and converging slightly with each other inwards of grip element 3; and each tooth 20 has a side 21 facing inwards of grip element 3 and shaped to engage a respective seat 9. More specifically, side 21 of each tooth 20 comprises a portion 22 substantially perpendicular to, and for connection to, edge 18; a sloping portion 23 which mates with a sloping portion 13 of seat 9; a substantially straight portion 24; and a further sloping portion 25 sloping in the opposite direction to sloping portion 23 and defining a lead-in for insertion of tooth 20 inside respective seat 9. Teeth 20 in each pair are preferably connected by a crosspiece 26.

According to the invention, base element 2 and grip element 3 are made separately from the most advantageous materials, and in particular are made respectively from a thermosetting polymer material (such as extended phenol-formaldehyde resins) and a thermoplastic polymer material, which can easily be formed into any shape (including underside recesses, cavities, projections, etc.) and colour (practically no limitation). Grip element 3 is then simply clicked onto base element 2 by means of teeth 20 and respective seats 9. Apart from the nature of the polymer material from which grip element 3 is made, easy insertion of teeth 20 inside respective seats 9 is also ensured by the specific arc shape of grip element 3, which, together with the location of click-on fastening means 17 at opposite ends 16 of arc-shaped grip element 3, allows sufficient radial flexibility to part ends 16 far enough to insert teeth 20 inside respective seats 9.

Figure 4:
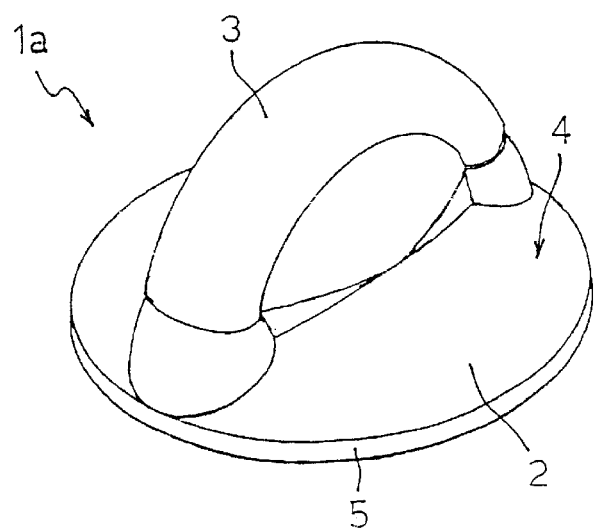
FIG. 4 shows a view in perspective of a second embodiment of the grip according to the invention and as assembled.
Figure 5:
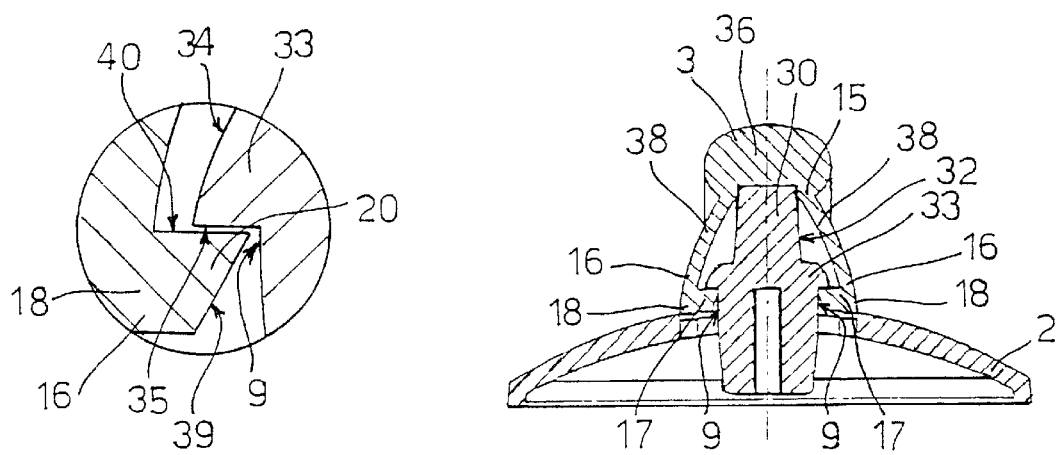
FIGS. 5 and 6 show two sections, in respective perpendicular planes, of the FIG. 4 grip.
Figure 6:
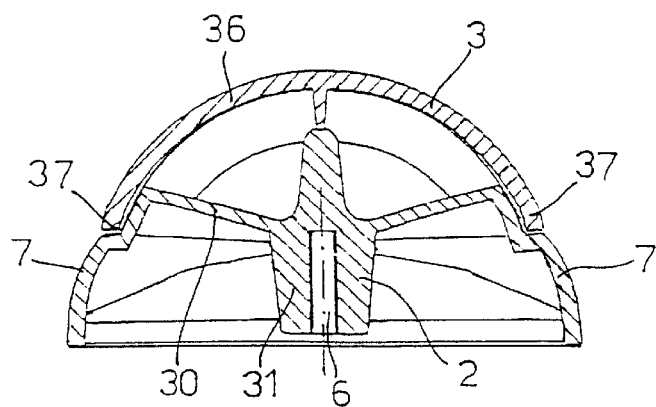

FIGS. 4 to 6, in which any details similar to or identical with those already described are indicated using the same numbering system, show a second embodiment of a grip in accordance with the present invention: a lid grip 1a again comprises a base element 2 and a grip element 3 projecting from base element 2; and base element 2 and grip element 3 are defined by respective separate monolithic bodies, are click-on connected to each other, and are made from a thermosetting polymer material, such as extended phenol-formaldehyde resin, and a thermoplastic polymer material respectively.

Base element 2 is again spherical-bowl-shaped, and comprises a convex upper surface 4, which in use is placed in view on the lid, and a circular peripheral edge 5 for connection to a surface of the lid. In this embodiment, however, base element 2 has a diametrical projection 30 projecting perpendicularly from convex surface 4 and which in turn comprises, at a bottom portion 31, fastening means 6 for connection to the lid. Projection 30 also comprises opposite lateral sides 32 in which are formed respective connecting seats 9. More specifically, seats 9 are defined by respective projections 33 projecting laterally outwards from sides 32 of projection 30, and having respective sloping lateral lead-in surfaces 34, and respective bottom connecting surfaces 35, as shown in the enlarged detail in FIG. 5.

Grip element 3 may be any shape, but nevertheless comprises an arc-shaped portion 15 having, at opposite ends 16, respective click-on fastening means 17 for connection to base element 2. In the example shown, grip element 3 has a curved central rib 36, the ends 37 of which rest on respective projections 7—e.g. defined by respective end portions of projection 30—of base element 2. Facing, diverging curved lateral walls 38 project transversely from rib 36 and define arc-shaped portion 15, which is thus crosswise to rib 36, i.e. to the monolithic body defining grip element 3; and walls 38 are provided, on respective edges 18 defining ends 16 of arc-shaped portion 15, with respective teeth 20 for connection to seats 9. Teeth 20, which project laterally towards each other from respective edges 18, are shaped to engage respective seats 9, and in particular comprise respective sloping surfaces 39 which cooperate with respective lateral surfaces 34 of seats 9, and respective flat surfaces 40 which mate with respective bottom mating surfaces 35 of seats 9.

In this case too, easy insertion of teeth 20 inside respective seats 9 is ensured, not only by the nature of the polymer material of grip element 3, but also by the flexibility of arc-shaped portion 15, and by the teeth being located at ends 16 of portion 15. More specifically, it is walls 38 of portion 15 which are deformed radially away from each other to part ends 16 far enough to insert teeth 20 inside respective seats 9.

Clearly, changes may be made to the grip as described and illustrated herein without, however, departing from the scope of the present invention.

What is claimed is:

1. A grip for fitting to a lid of a cooking vessel, said grip comprising:
   a base element comprising:
      first means for fastening said base element to an upper surface of a lid of a cooking vessel;
      a grip element for mounting on an upper surface of said base element, said grip element having opposed ends and comprising an arc-shaped portion of predetermined radial flexibility; and
      second means for fastening said grip element to said base element, said second means comprising;
         seat elements on the upper surface of the base element; and
         projections on said opposed ends on said arc-shaped portions of said grip element for snap-fit engagement with the seat elements on said base element so that the opposed ends on said grip element extend in a direction substantially perpendicular to the upper surface of the base element with said grip element mounted on said base element.

2. The grip as claimed in claim 1, wherein said base element is made of thermosetting polymer material; and said grip element is made of thermoplastic polymer material.

3. The grip as claimed in claim 2, wherein said thermosetting polymer material comprises a phenol-formaldehyde resin base.

4. The grip as claimed in claim 1, wherein said projections comprise at least a first and at least a second connection tooth, which engage said respective seat elements; the predetermined radial flexibility of said arc-shaped portion being sufficient to part said opposed ends of said arc-shaped portion sufficiently for said first tooth and said second tooth to engage the respective seat elements so as to facilitate said snap-fit engagement.

5. The grip as claimed in claim 4, wherein said seat elements are located diametrically opposite each other on said base element; said first tooth and said second tooth projecting from respective edges of said opposed ends of the arc-shaped portion, and having respective sides facing each other and inwards of said arc-shaped portion and shaped to correspond with said seat elements.

6. The grip as claimed in claim 1, wherein said grip element is defined by a monolithic arc-shaped body; said arc-shaped portion of said grip element being positioned longitudinally with respect to said monolithic body.

7. The grip as claimed in claim 1, said grip element is defined by a monolithic arc-shaped body; said arc-shaped portion of said grip element being positioned crosswise with respect to said monolithic body.

8. The grip as claimed in claim 7, wherein the base element comprises a curved upper surface and an opposed surface for fitting to the lid of the cooking vessel, said seat elements being disposed on said curved upper surface, and said first means for fastening being disposed at said opposed surface of the base element.

9. The grip as claimed in claim 7, wherein said projections and said arc-shaped portion comprise a unitary body.

10. A grip for fitting to a lid of a cooking vessel, said grip comprising:
   a base element comprising:
      first means for fastening said base element to an upper surface of a lid of a cooking vessel;
      a grip element for mounting on an upper surface of said base element, said grip element having opposed ends and comprising an arc-shaped portion of predetermined radial flexibility; and second means for fastening said grip element to said base element, said second means comprising;
    seat elements on the upper surface of the base element; and
    projections on said opposed ends on said arc-shaped portions of said grip element for snap-fit engagement with the seat elements on said base element so that the opposed ends on said grip element extend in a direction substantially perpendicular to the upper surface of the base element with said grip element mounted on said base element;
wherein said base element is made of thermosetting polymer material; and said grip element is made of thermoplastic polymer material.

* * * * *